United States Patent
Bieker

(10) Patent No.: US 6,851,588 B2
(45) Date of Patent: Feb. 8, 2005

(54) APPARATUS AND METHODS FOR CONVERTING THE LOAD COMPARTMENT OF A VEHICLE INTO A WATER TANK

(76) Inventor: Steve Bieker, 12915 SE. Ridge Crest Dr., Portland, OR (US) 97226

( * ) Notice: Subject to any disclaimer, the term of this patent is extended or adjusted under 35 U.S.C. 154(b) by 107 days.

(21) Appl. No.: 10/052,859

(22) Filed: Jan. 17, 2002

(65) Prior Publication Data

US 2003/0132256 A1 Jul. 17, 2003

(51) Int. Cl.[7] .................................................. B67D 5/64
(52) U.S. Cl. ..................... 222/609; 222/610; 239/289; 239/172; 414/725; 414/912; 37/289; 37/403
(58) Field of Search ............................ 222/608–610, 222/192; 239/289, 172; 414/725, 912; 37/903, 403

(56) References Cited

U.S. PATENT DOCUMENTS

| | | |
|---|---|---|
| 882,098 A | 3/1908 | Chial |
| 1,128,856 A | 2/1915 | Cornwall et al. |
| 1,506,652 A | 8/1924 | Maker |
| 3,263,865 A | 8/1966 | Kachnik |
| 3,393,835 A | 7/1968 | Kantor et al. |
| 3,797,743 A | 3/1974 | Kommers et al. |
| 4,089,446 A | 5/1978 | Logan, II et al. |
| 4,723,710 A | 2/1988 | Lucore, II |
| 5,098,019 A | 3/1992 | Landefeld |
| 5,199,196 A * | 4/1993 | Straley .......................... 37/442 |
| 5,318,314 A | 6/1994 | Cyphers et al. |
| 5,480,191 A | 1/1996 | Litin et al. |
| 5,564,886 A * | 10/1996 | Emerson et al. ............. 414/725 |
| 5,667,113 A * | 9/1997 | Clarke et al. ................ 222/608 |
| 5,897,038 A * | 4/1999 | Myers .......................... 222/608 |
| 6,145,711 A * | 11/2000 | Prosper et al. .............. 222/608 |
| 6,595,392 B2 * | 7/2003 | Barnett ........................ 222/105 |

OTHER PUBLICATIONS

Drawings of original water tank design (shaped to fit within the hopper of a Bobcat skid–steer loader) by inventor, pp. 1–3, publicly used prior to Jan. 17, 2001.

* cited by examiner

Primary Examiner—Philippe Derakshani
(74) Attorney, Agent, or Firm—Klarquist Sparkman LLP

(57) ABSTRACT

According to a disclosed embodiment of the invention, an apparatus for converting the load compartment of a vehicle into a tank for carrying liquids comprises a removable cover assembly configured to cover an upper opening of the load compartment. A pump, which can be mounted to the cover assembly, is provided for pumping liquid from the load compartment. The outlet of the pump may be fluidly connected to a discharge conduit, which may be coupled to the cover assembly. The discharge conduit desirably extends at least partially inside the cover assembly. An opening may be defined in the cover assembly for introducing liquid into the load compartment.

31 Claims, 4 Drawing Sheets

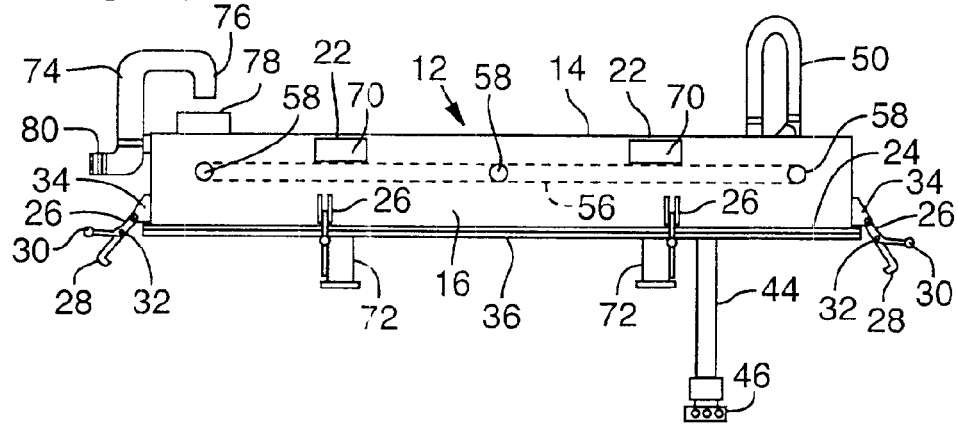
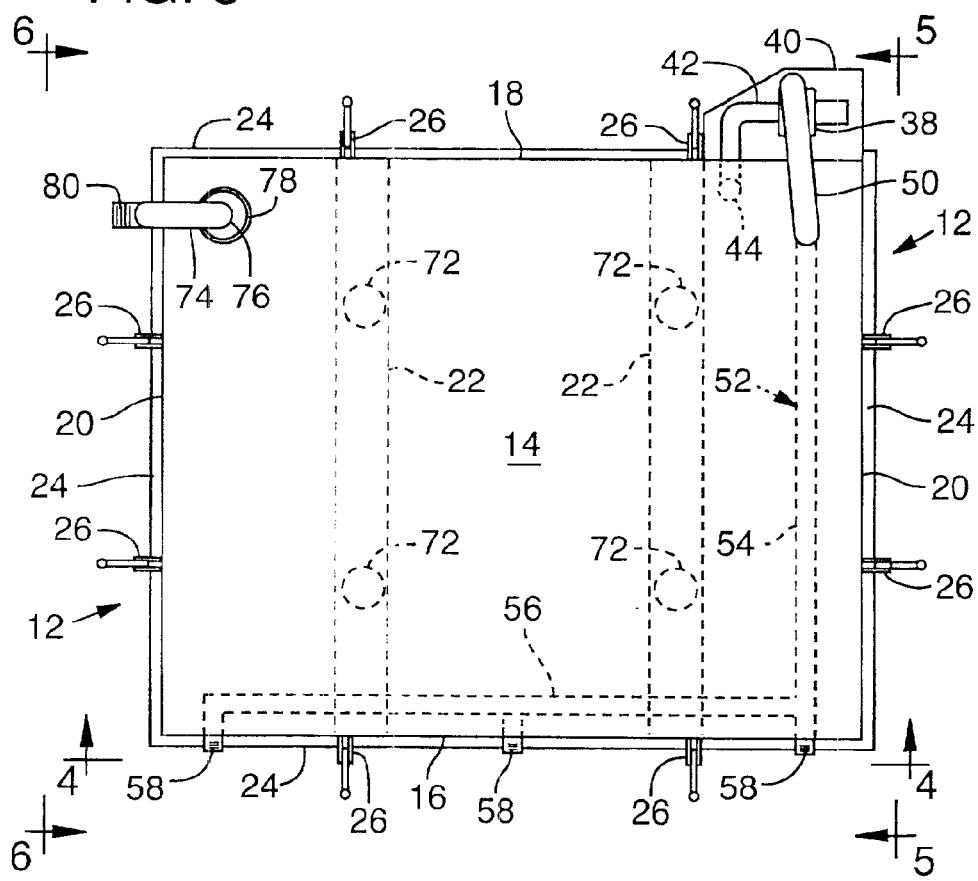

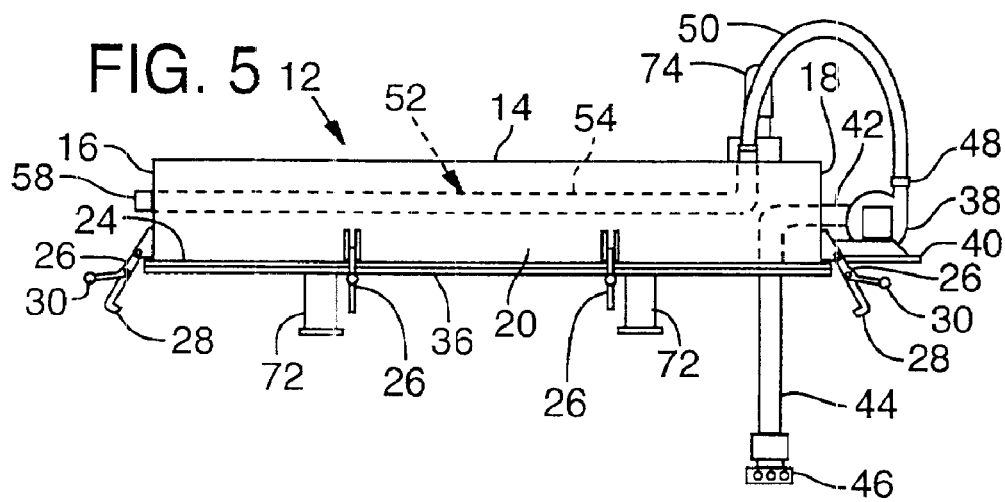
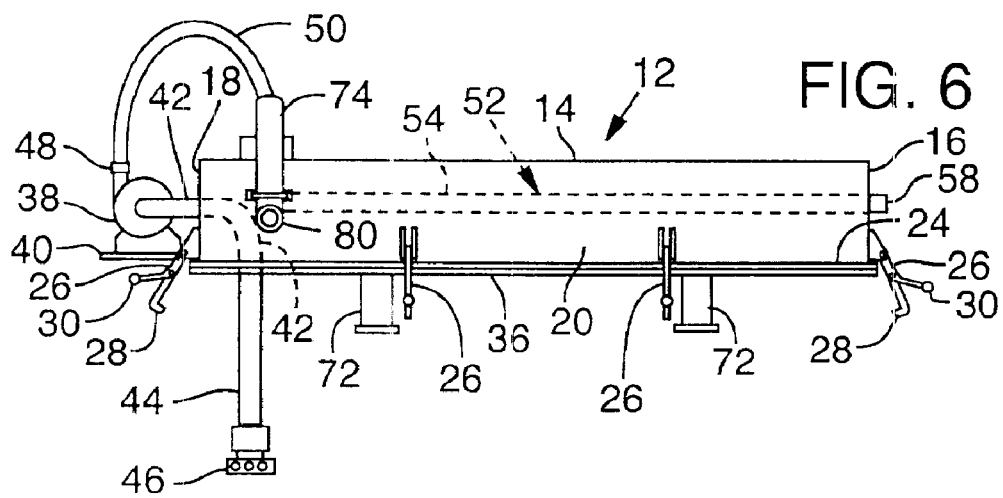

APPARATUS AND METHODS FOR CONVERTING THE LOAD COMPARTMENT OF A VEHICLE INTO A WATER TANK

FIELD OF THE INVENTION

The present invention relates to apparatus and methods for converting the load compartment of a vehicle into a water tank.

BACKGROUND OF THE INVENTION

Water tank trucks are used in various aspects of construction, such as for storing, conveying, or distributing water, for example, spraying on a dirt surface to minimize dust creation. The high cost of water tank trucks, however, can be prohibitive, especially for small-scale contractors. Most contractors, however, typically have in their possession some type of vehicle for hauling construction materials, such as a dump truck, a pick-up truck, or a skid-steer loader. Accordingly, as an alternative to conventional water tank trucks, apparatuses have been devised for enabling the load compartment of a vehicle, typically used for hauling solid materials, to convey and distribute water.

One such apparatus is shown U.S. Pat. No. 3,393,835 to Kantor et al. This patent discloses a flexible container that is shaped to complement the interior space of the load compartment of a dump truck. As another example, U.S. Pat. No. 5,098,019 to Landefeld discloses a removable tank assembly that is sized to fit the bed of a dump truck.

It is an object of the present invention to provide new and improved apparatuses for converting the water-tight load compartment of a vehicle into a tank for carrying and discharging liquids (e.g., water), but which apparatuses can be quickly and easily removed to permit the load compartment to be used for other purposes.

SUMMARY OF THE INVENTION

According to one aspect of the present invention, an apparatus is provided for converting the load compartment of a vehicle into a tank for containing liquids. In one representative embodiment, a removable cover assembly is configured to cover an upper opening of the load compartment. A discharge conduit, through which liquid contained in the load compartment can be removed, may be coupled to the cover assembly. Desirably, the discharge conduit extends at least partially within the interior space of the cover assembly so that it will not be damaged when the cover assembly is removed from the load compartment.

In a disclosed embodiment, a pump, which can be mounted to the cover assembly, is provided for pumping liquid contained in the load compartment through the discharge conduit. An opening may be defined in the cover assembly for introducing liquid into the load compartment when the cover assembly is installed thereon. In addition, the cover assembly desirably has at least one latch mechanism for releasably latching the cover assembly to the load compartment.

According to yet another representative embodiment, an apparatus for converting the load compartment of a vehicle into a tank for containing liquids comprises a removable cover assembly configured to cover an upper opening of the load compartment. The cover assembly has at least one latch mechanism for releasably latching the cover assembly to the load compartment. A pump is carried by the cover assembly for removing liquid contained in the load compartment. A discharge conduit has a first end in fluid communication with an outlet of the pump and a second end positioned to discharge liquid from the load compartment.

According to another representative embodiment, an apparatus for converting the dumping hopper of a loader into a tank for containing liquids comprises a removable cover assembly for covering the upper opening of the hopper. The cover assembly is configured such that, when the cover assembly is installed on the hopper, a substantially liquid-tight seal is formed between the cover assembly and the hopper.

According to still another representative embodiment, an apparatus comprises a container for holding liquids configured to fit within the load compartment of a vehicle. A pump, having an inlet and an outlet, may be provided for removing liquid from the container. A discharge conduit, fluidly connected to the outlet of the pump, extends at least partially through the inside of the container.

A method according to one embodiment for converting the load container of a vehicle into a tank for containing liquids comprises covering the open top of the load container with a cover so that a substantially liquid-tight seal is formed between the cover and the load container. Liquid can be introduced into the load container, such as through an opening in the cover. If desired, liquid can be removed from the load container with a pump.

These and other features of the invention will be more fully appreciated when the following detailed description of the invention is read in conjunction with the accompanying drawings.

BRIEF DESCRIPTION OF THE DRAWINGS

FIG. 3 is a top plan view of the cover assembly of FIG. 1.

FIG. 4 is a front elevation view of the cover assembly taken along line 4—4 of FIG. 3.

FIG. 5 is a side elevation view of the cover assembly taken along line 5—5 of FIG. 3.

FIG. 6 is a side elevation view of the cover assembly taken along line 6—6 of FIG. 3.

DETAILED DESCRIPTION

Figure 1:
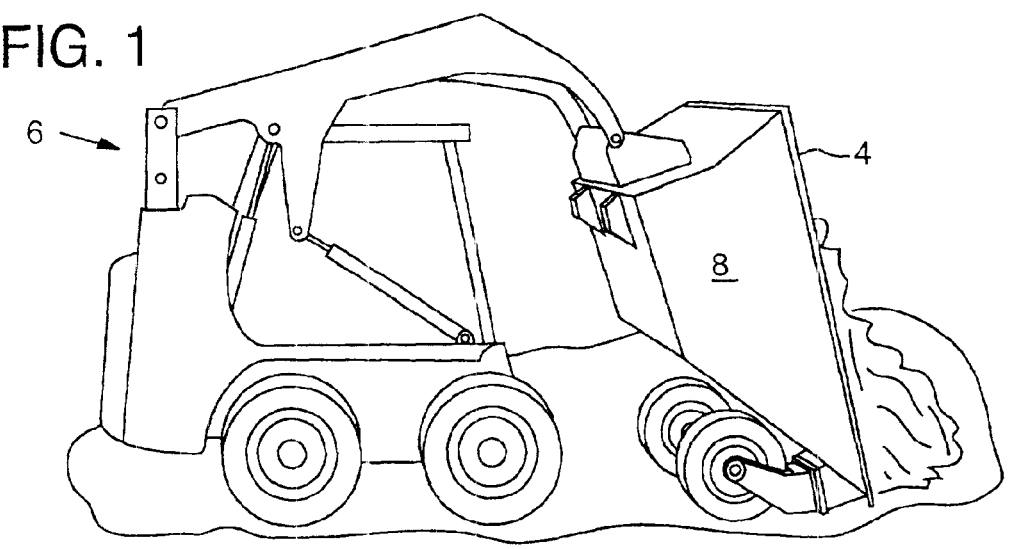
FIG. 1 is a perspective view illustrating a conventional use for a skid-steer loader and a dumping hopper.

FIG. 1 shows a skid-steer loader 6 (which is also simply known as a "loader") and a dumping hopper 8 being used in a conventional manner to transfer earth at a construction site. According to one aspect of my invention, an apparatus is provided for converting the load compartment of a vehicle, such as the dumping hopper 8 of the skid-steer loader 6 shown in FIG. 1, into a tank for containing liquids.

Figure 2A:
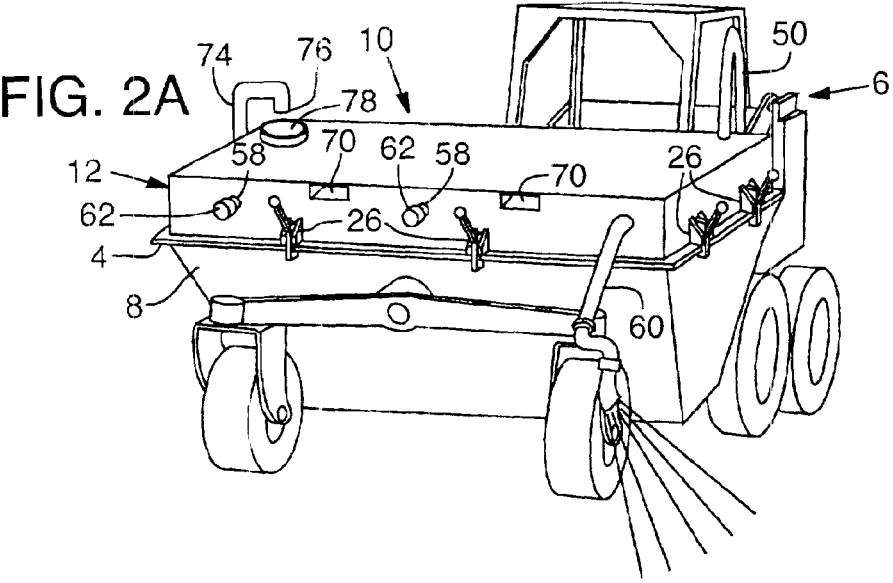
FIGS. 2A and 2B are respective perspective views illustrating the loader and dumping hopper of FIG. 1, showing a cover assembly according to one embodiment of the invention installed on the dumping hopper to permit use of the dumping hopper as a water tank.
Figure 2B:
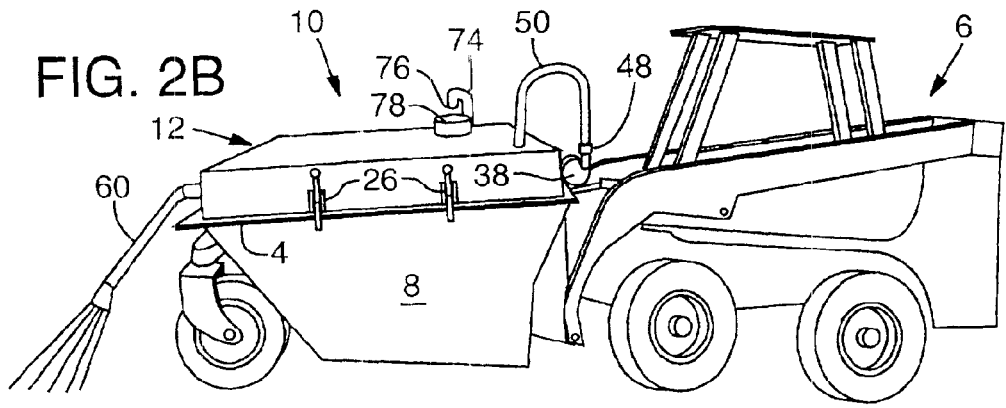

More specifically, and referring to FIGS. 2A and 2B, there is shown an apparatus according to one embodiment of the invention, indicated generally at 10, comprising a cover assembly 12 configured to cover the top, or upper, opening of the dumping hopper 8. Although the following description proceeds in connection with the dumping hopper 8 shown in FIGS. 1, 2A and 2B, the cover assembly 12 can be adapted for use with the load compartment of other types of vehicles, such as a dump truck, a pick-up truck, or other types of vehicles conventionally used for hauling materials, which provide an open-top, water-tight container.

FIGS. 3–6 show the details of the cover assembly 12 of FIGS. 2A and 2B. As best shown in FIG. 3, the cover assembly 12 in the illustrated configuration has a generally rectangular shape so as to correspond to the upper opening of the dumping hopper 8. However, the shape of the cover assembly 12 can vary depending upon the shape of the particular load compartment being used. The cover assembly 12 in this example generally comprises a top wall 14, a front wall 16, a rear wall 18, and opposed side walls 20 extending between respective ends of the front and rear walls 16, 18, respectively. A flange 24 extends outwardly from the bottom edges of the walls 16, 18, and 20. The cover assembly 12 can be made of any suitable material, such as steel, aluminum, plastic, fiber-glass, or any of other various materials.

As shown in FIG. 3, the cover assembly 12 may include generally rectangular-shaped channels 22, desirably extending inside the cover assembly between the front wall 16 and the rear wall 18. As shown in FIG. 4, the channels 22 extend through the front wall 16 to define respective openings 70. The channels 22 desirably are sized and spaced to receive the tines, or forks, of a forklift to facilitate installation and removal of the cover assembly 12. The channels 22 may be secured to the bottom surface of the top wall 14 in a conventional manner, such as by welding.

The cover assembly 12 desirably includes a plurality of latch mechanisms 26 coupled to the walls 16, 18 and 20 for releasably latching the cover assembly 12 to the dumping hopper 8. As best shown in FIG. 4, each latch mechanism 26 in the illustrated configuration comprises a lower hook portion 28 configured to engage or hook onto an adjacent portion of the dumping hopper 8. The hook portion 28 of each latch mechanism 26 is pivotally coupled to a respective lever arm 30 at 32. The lever arm 30 of each latch mechanism is in turn pivotally coupled to a respective bracket 34 of the cover assembly 12.

To latch the cover assembly 12 to the dumping hopper 8, the cover assembly 12 is first placed over the open top of the dumping hopper 8 with the flange 24 supported on a corresponding flange 4 of the dumping hopper 8 (see FIGS. 2A and 2B). With the cover assembly 12 in place, the lower hook portion 28 of each latch mechanism 26 is positioned underneath the flange 4 of the dumping hopper 8. The lever arms 30 of the latch mechanisms 26 are then flipped or pivoted upwards to cause the hook portions 28 to engage the lower surface of the flange 4 of the dumping hopper 8, thereby holding the cover assembly 12 securely in place over the open top of the dumping hopper 8. When the cover assembly 12 is installed on the dumping hopper 8, such as shown FIGS. 2A and 2B, a substantially fluid-tight seal is formed between the cover assembly 12 and the dumping hopper 8 to permit use of the loader 6 and the dumping hopper 8 as, for example, a water tank truck.

A sealing member 36 (shown in FIGS. 4–6) preferably is positioned between the flanged portion 24 of the cover assembly 12 and the flanged portion 4 of the dumping hopper 8 to ensure a fluid-tight seal. The sealing member 36 may comprise, for example, a gasket made from a suitable material, such as rubber. If the dumping hopper 8 contains any drainage holes (not shown) in the bottom surface thereof, the holes may be covered, such as with rubber plugs (not shown) to retain liquid in the dumping hopper 8.

A pump 38 may be provided for discharging liquid contained in the dumping hopper 8. The pump 38 can be provided as an integral unit with the cover assembly 12. In the illustrated configuration, for example, the pump 38 is mounted to, or otherwise carried by, a support member 40 extending outwardly from the rear wall 18 of the cover assembly 12. Although not required, the pump 38 desirably is a power take-off type pump. For example, the pump 38 in a working embodiment comprises a hydraulically-driven pump adapted for connection to an existing hydraulic system of the skid-steer loader 6. Alternatively, the pump 38 can be operatively coupled to a drive shaft of the loader 6. In other embodiments, other forms of drive mechanisms can be use to power the pump 38, such as a dedicated motor or engine.

In addition, in alternative embodiments, the pump 38 may comprise a submersible pump disposed inside the hopper 8. In this case, an inlet conduit to the pump 38 (described below) may be optional.

As best shown in FIGS. 5 and 6, the pump 38 has an inlet 42 and an outlet 48. The inlet 42 of the pump 38 is connected to an inlet conduit in the form of a downwardly extending inlet pipe 44. The inlet pipe 44 desirably comprises a flexible pipe or hose and can be coupled to the inlet 42 of the pump 38 with a quick-disconnect mechanism, such as a cam lock fitting. The lower, or inlet, end of the inlet pipe 44 extends to a position just above the bottom surface of the dumping hopper 8 when the cover assembly 12 is installed thereon. As shown, a check valve or a back-flow preventer 46 may be coupled to the inlet end of the inlet pipe 44.

Liquid in the hopper 8 is pumped by the pump 38 through an outlet conduit, which in the illustrated configuration, comprises a flexible hose or tube 50 and a discharge manifold 52. As best shown in FIGS. 5 and 6, the flexible hose 50 is connected at one end to the outlet 48 of the pump 38 and at its opposite end to the discharge manifold 52. The discharge manifold 52 desirably is mounted within the interior space defined by the cover assembly 12 to avoid damage to the discharge manifold when the cover assembly is removed from the dumping hopper 8 and placed on the ground. As best shown in FIG. 3, the discharge manifold 52 in this example comprises a first, transverse pipe 54 that extends from the rear wall 18 to the front wall 16 and a second, longitudinal pipe 56 connected at one end to the first pipe and extending between the side walls 20. The second pipe 56 may have plural outlets 58 that extend through the front wall 16 of the cover assembly 12. In addition, as shown in FIGS. 4–6, the first and second pipes 54, 56, respectively, extend in a plane that is substantially parallel to the top wall 14.

In the method of use illustrated in FIGS. 2A and 2B, an extension pipe 60 can be connected to one of the outlets 58 to spray water onto the road surface for clearing debris. The remaining outlets 58, which are not being used, can be covered with removable end caps 62.

As shown in FIGS. 3–6, the cover assembly 12 may include optional legs 72 to support the cover assembly 12 on the ground when it is removed from the hopper 8. The legs 72 desirably are connected at their upper ends to the bottom of a respective channel 22 (as shown in FIG. 3).

An inlet fill pipe 74 can be mounted to the outside of the cover assembly 12 (FIGS. 3, 4 and 6) for introducing liquid into the hopper 8. An inlet end 80 of the fill pipe 74 can be configured to be connectable to a liquid-supply hose (e.g., a water hose) for supplying liquid to the hopper 8. An outlet end 76 of the fill pipe 74 is positioned to direct liquid downwardly through a fill port 78 defined in the top wall 14 of the cover assembly 12 (as best shown in FIG. 3).

Figure 7:
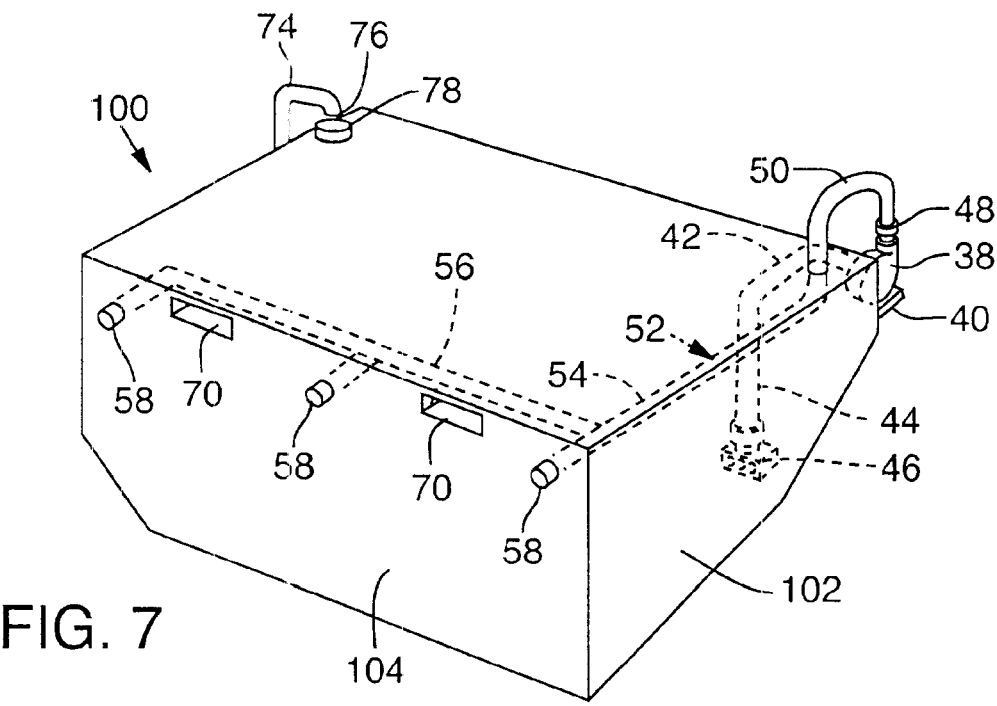
FIG. 7 is a perspective view of an apparatus according to another embodiment of the invention for converting a dumping hopper into a tank for containing liquids.
Figure 8:
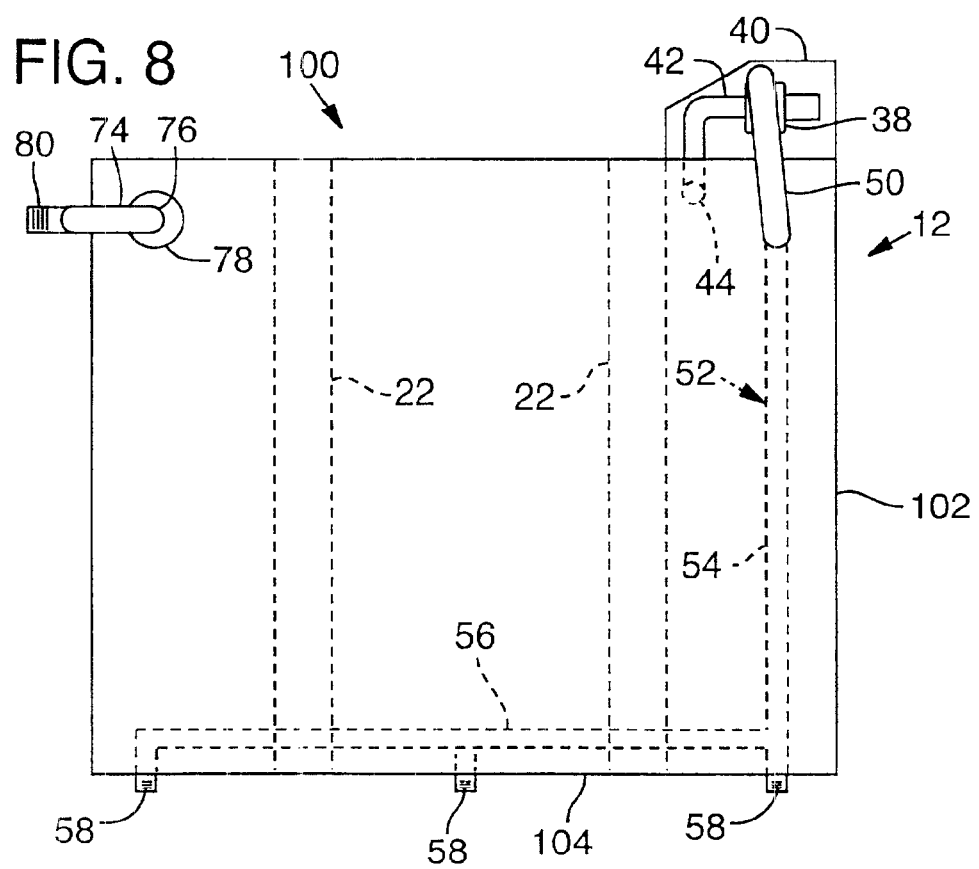
FIG. 8 is a top plan view of the apparatus of FIG. 7.

Referring to FIGS. 7 and 8, there is shown an apparatus 100, according to another embodiment of the invention, for converting the load compartment of a vehicle, such as the dumping hopper 8 of the skid-steer loader 6 shown in FIG. 1, into a tank for containing liquids. The apparatus 100 in this embodiment comprises a container or enclosure 102 that is shaped to fit inside the hopper 8. A pump 38, having an inlet 42 and an outlet 48, desirably is mounted to a support 40 fixed to the outside surface of the enclosure 102. In alternative embodiments, the pump 38 may be a submersible pump mounted inside of the enclosure.

An inlet pipe 44 having a back-flow preventer 46 at the inlet end thereof is fluidly connected to the inlet 42 of the pump 38. A flexible discharge hose 50 fluidly connects the discharge 48 of the pump 38 to the inlet of a discharge manifold 52. The discharge manifold 52, like the embodiment of FIGS. 3–6, is mounted inside of the enclosure 102 to avoid damage to the discharge manifold. As shown in FIG. 8, the discharge manifold 52 comprises a first, transversely extending pipe 54 and a second, longitudinally extending pipe 56. Plural outlets 58 extend from the second pipe 56 through a front wall 104 of the enclosure 102.

In addition, like the embodiment of FIGS. 3–6, channels 22, are desirably mounted inside the enclosure 102, to receive the forks of a forklift for lifting the enclosure 102 during installation or removal of the enclosure 102 or for otherwise transporting the enclosure 102. Also, an inlet fill pipe 74 may be mounted to the outside of the enclosure 102 for introducing liquid into the enclosure through a fill port 78 defined in the top wall of the enclosure.

An important use of the apparatuses described herein, as illustrated in FIGS. 2A and 2B, is spraying water on a road surface to clear debris therefrom. The apparatuses can also be used to spray water on a dirt surface at a construction site to minimize dust creation or to haul water to a remote site where water is not readily available.

The invention has been described with respect to particular embodiments and modes of action for illustrative purposes only. The present invention may be subject to many modifications and changes without departing from the spirit or essential characteristics thereof. I therefore claim as my invention all such modifications as come within the scope of the following claims.

I claim:

1. An apparatus for converting the load compartment of a vehicle into a tank for carrying liquids, wherein the load compartment has an upper edge defining an upper opening, the apparatus comprising:

a removable cover assembly configured to engage said upper edge and cover the upper opening of the load compartment so as to convert the load compartment into the tank, wherein the inside of the tank is defined by the inner surfaces of the load compartment and the cover assembly; and a discharge conduit coupled to the cover assembly through which liquid contained in the load compartment can be removed.

2. The apparatus of claim 1 further comprising at least one latch mechanism for releasably latching the cover assembly to the load compartment.

3. The apparatus of claim 1, wherein the load compartment is a dumping hopper.

4. The apparatus of claim 1 further comprising a sealing member for positioning between the load compartment upper edge and the cover assembly.

5. An apparatus for converting the load compartment of a vehicle into a tank for carrying liquids, wherein the load compartment has an upper edge defining an upper opening, the apparatus comprising:

a removable cover assembly configured to engage said upper edge and cover the upper opening of the load compartment;

a discharge conduit coupled to the cover assembly through which liquid contained in the load compartment can be removed; and a pump carried by the cover assembly and having an inlet and an outlet, the outlet of the pump being fluidly connected to the discharge conduit, the pump configured to discharge liquid contained in the load compartment through the discharge conduit.

6. The apparatus of claim 5, wherein the discharge conduit extends at least partially inside the cover assembly.

7. The apparatus of claim 1, wherein the cover assembly defines an opening for introducing liquid into the load compartment.

8. The apparatus of claim 1, wherein the cover assembly has a top wall and a portion of the discharge conduit extends inside the cover assembly within a plane that is substantially parallel to the top wall of the cover assembly.

9. An apparatus for converting the load compartment of a vehicle into a tank for containing liquids, wherein the load compartment has an upper edge defining an upper opening, the apparatus comprising:

a cover adapted to engage said upper edge and cover the upper opening so as to convert the load compartment into a tank for retaining liquid; and a pump carried by the cover for discharging liquid contained in the load compartment.

10. An apparatus for converting the load compartment of a vehicle into a tank for containing liquids, wherein the load compartment has an upper edge defining an upper opening, the apparatus comprising:

a cover adapted to engage said upper edge and cover the upper opening for retaining liquid contained in the load compartment; and a pump carried by the cover for discharging liquid contained in the load compartment;

wherein the cover has a top wall with an upper and lower major surface and the apparatus further comprises a discharge manifold supported proximate the lower major surface of the top wall.

11. The apparatus of claim 9 further comprising at least one latch assembly for releasably latching the cover to the load compartment.

12. An apparatus for converting the load compartment of a vehicle into a tank for containing liquids, wherein the load compartment has an upper edge defining an upper opening, the apparatus comprising:

a cover adapted to engage said upper edge and cover the upper opening for retaining liquid contained in the load compartment; and a pump carried by the cover for discharging liquid contained in the load compartment;

wherein the cover defines openings adapted to receive the forks of a forklift.

13. An apparatus for converting the load compartment of a vehicle into a tank for containing liquids, wherein the load compartment defines an upper opening, the apparatus comprising:

a removable cover assembly configured to cover the upper opening of the load compartment, the cover assembly having at least one latch mechanism for releasably latching the cover assembly to the load compartment;

a pump carried by the cover assembly for removing liquid contained in the load compartment; and a discharge conduit having a first end in fluid communication with an outlet of the pump and a second end positioned to discharge liquid from the load compartment.

14. The apparatus of claim 13, wherein the discharge conduit has a portion that extends within the interior space of the cover assembly.

15. The apparatus of claim 13 further comprising a back-flow preventer and an inlet conduit having a first end fluidly connected the back-flow preventer and a second end fluidly connected to an inlet of the pump.

16. An apparatus for converting the load compartment of a vehicle into a tank for containing liquids, wherein the load compartment defines an upper opening, the apparatus comprising:

means for covering the upper opening so as to convert the load compartment into a tank for retaining liquid; and means for removing liquid contained in the load compartment.

17. The apparatus of claim 16, wherein the means for covering the upper opening of the load compartment is configured to form a liquid-tight seal with the load compartment.

18. The apparatus of claim 16, wherein the means for covering the upper opening of the load compartment is releasably latchable to the load compartment.

19. An apparatus for converting the dumping hopper of a loader into a tank for carrying liquids, wherein the hopper defines an upper opening, the apparatus comprising:

a removable cover assembly for covering the upper opening of the hopper so as to convert the hopper into a tank for containing liquid; and wherein when the cover assembly is positioned to cover the upper opening, a substantially liquid-tight seal is formed between the cover assembly and the hopper.

20. The apparatus of claim 19, wherein the cover assembly is configured to be releasably latchable to the hopper.

21. The apparatus of claim 19, further comprising a pump carried by the cover assembly for discharging liquid from the hopper, the pump having an inlet and an outlet.

22. An apparatus for converting the dumping hopper of a loader into a tank for carrying liquids, wherein the hopper defines an upper opening, the apparatus comprising:

a removable cover assembly for covering the upper opening of the hopper;

wherein when the cover assembly is positioned to cover the upper opening, a substantially liquid-tight seal is formed between the cover assembly and the hopper;

a pump carried by the cover assembly for discharging liquid from the hopper, the pump having an inlet and an outlet; and an inlet conduit and an outlet conduit, the inlet conduit having a first, inlet end and a second end fluidly connected to the inlet of the pump, and the outlet conduit having a first end fluidly connected to the outlet of the pump and a second end positioned to discharge liquid from the hopper.

23. An apparatus for converting the dumping hopper of a loader into a tank for carrying liquids, wherein the hopper defines an upper opening, the apparatus comprising:

a removable cover assembly for covering the upper opening of the hopper;

wherein when the cover assembly is positioned to cover the upper opening, a substantially liquid-tight seal is formed between the cover assembly and the hopper; and support legs for supporting the cover assembly in a substantially horizontal position when the cover assembly is removed from the hopper.

24. A method for carrying liquid in an open-top load container of a vehicle, the method comprising:

covering the open top of the load container with a cover so as to convert the load container into a tank for containing liquid and so that a substantially liquid-tight seal is formed between the cover and the load container; and introducing a liquid into the load container through an opening in the cover.

25. The method of claim 24 further comprising removing liquid from the load container with a pump.

26. The method of claim 24, wherein covering the open top of the load container further comprises latching a cover to the load container.

27. The apparatus of claim 1 further comprising a pump carried by the cover assembly and having an inlet and an outlet, the outlet of the pump being fluidly connected to the discharge conduit, the pump configured to discharge liquid contained in the load compartment through the discharge conduit.

28. The apparatus of claim 27, wherein the discharge conduit extends at least partially inside the cover assembly.

29. An apparatus for converting the load compartment of a vehicle into a tank for carrying liquids, wherein the load compartment has an upper opening, the apparatus comprising a removable cover configured to form a substantially liquid-tight seal around the upper opening of the load compartment so as to convert the load compartment into a tank for retaining liquid.

30. The apparatus of claim 29, wherein the cover comprises:

a top wall;

side walls extending downwardly from the top wall;

a front wall extending downwardly from the top wall;

a rear wall extending downwardly from the top wall; and an open bottom defined by the top wall, the side walls, the front wall, and the rear wall.

31. The apparatus of claim 30, wherein the cover further comprises a peripheral flange connected to the side walls, the front wall, and the rear wall and configured to engage the load compartment around the upper opening.

* * * * *